Jan. 1, 1952     J. G. COWLES     2,580,522
RETRACTABLE GROUND-GRIPPING DEVICE FOR VEHICLE WHEELS
Filed March 12, 1948     2 SHEETS—SHEET 1

INVENTOR.
John G. Cowles
BY
Atty.

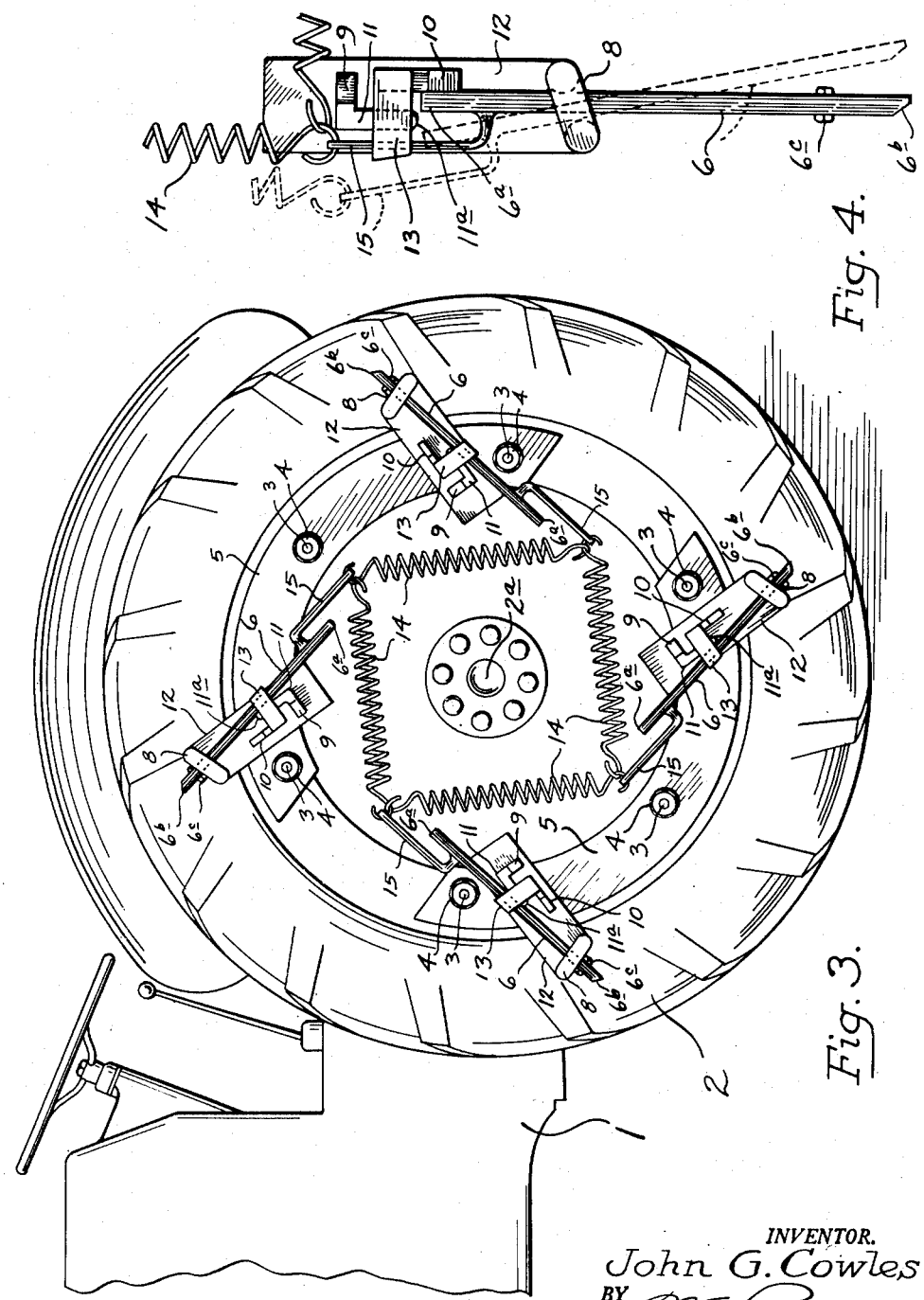

Patented Jan. 1, 1952

2,580,522

UNITED STATES PATENT OFFICE 2,580,522

RETRACTABLE GROUND-GRIPPING DEVICE FOR VEHICLE WHEELS

John G. Cowles, Rainier, Oreg.

Application March 12, 1948, Serial No. 14,458

9 Claims. (Cl. 301—50)

My invention relates to accessory devices which are adapted to be mounted upon the sides of the driving wheels of vehicles so that the driving wheels have a better grip upon the ground than they would without said devices. My invention is directed particularly to the use of such devices in connection with pneumatic tired wheels and where said vehicles are required to traverse hard surfaced roads as well as muddy, loose ground, as over a freshly plowed field.

One of the principal objects of my invention is to provide devices of this character which may easily and quickly be mounted upon one of said wheels, and may easily and selectively be arranged either to be extended beyond the peripheral outline of said wheel or to be retracted within said outline. In the first position of said devices, they are adapted to engage the ground to provide traction upon a loose and slippery surface and in the latter position, may be retracted so that the vehicle will be supported upon the pneumatic tires and the antifriction devices are in out-of-way position.

One of the principal objects of my invention is to provide devices of this character which may be moved into either of said two positions manually with little difficulty and which, when in said position, will be held there against inadvertent dislodgment.

A further and more specific object of my invention is to provide an antiskid device of this character with extensible pointed spuds which are slidably mounted in sockets, said sockets being mere skeletal outlines so that mud or other foreign matter will not become lodged therein to prevent said spuds from moving freely within said sockets.

A further and more specific object of my invention is to provide an antiskid device of this character, in which said pointed spuds may serve virtually as broad paddles to provide greater traction than if they were of narrower section. The guide means for said spuds are adapted to hold said spuds edgewise against said wheels firmly and securely.

A further and more specific object of my invention is to provide a spring mounting for said extensible spuds, which spring mounting will hold said spuds in extended position against inadvertent dislodging, but which will tend to retract them under proper manual manipulation and will hold said spuds retracted.

A further and more specific object of my invention is to provide retractable spuds and sockets therefor which permit said spuds to be held securely in extended or projecting position, prevent them from canting or tipping, and yet which will permit them easily to be retracted by a mere unseating and tipping motion.

Further and other details of my invention are hereinafter described with reference to the accompanying drawings, in which:

Fig. 3 is an elevation showing the parts in a manner similar to Fig. 1, but with the spuds forming the antiskid device arranged in retracted position; and Fig. 4 is an enlarged view of one of said spuds and its socket, illustrating the manner in which a spud may be tipped to permit it to be retracted into out-of-the-way position, the tipping of said spud being indicated in dotted outline.

Figure 2:
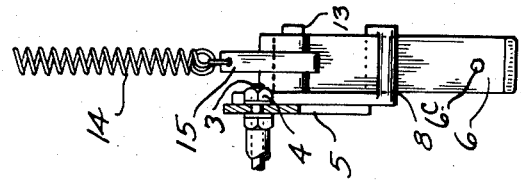
Fig. 2 is a sectional view of one of the spuds and its socket, said figure being taken on the line 2—2 in Fig. 1.

My invention is adapted particularly for use with a tractor 1, having pneumatic tired driven wheels 2. It is not to be deemed limited to use with pneumatic tired wheels, but I believe that in this field it has greatest utility, for the reason that pneumatic tires provide a good effective tread upon hard, compact road surfaces. Said tires have limited antiskid qualities when traversing soft ground, particularly if the ground is muddy. Said wheels normally are secured to the drive shaft of the tractor and its associated parts, by bolts or studs 3, having threaded nuts 4 secured thereon. I preferably utilize this means of attachment for securing two arcuate frame members 5 to one face of each wheel. This may be accomplished by removing said nuts, placing said frame members on the studs, and then securing the nuts in place over said frame members.

In the accompanying drawings, I show four retractable spuds 6. This is merely an arbitrary number that I have selected for convenience. If four spuds are provided, then it is convenient to provide two sockets 7 for said spuds upon each of the frame members. Said sockets form skeletal outlines of a mouth 8, a bottom 9, a back wall 10, a short front wall 11, a base 12, and a lateral guide 13. A spud is adapted to be seated in each socket with one end 6a abutting against the bottom 9 of the socket when said spud is in projecting or extended position. In said position, an intermediate portion of said spud is slidably engaged by the mouth of the socket, and the back and front walls are spaced apart a distance equal to the thickness of said spud. The lateral guide 13 and the base 12 are spaced apart a distance comparable to the width of said spud, and thus lateral movement of said spud is inhibited by the proximity of said parts.

I preferably select a spud which is elongated and which is flat in cross-section. A spud thus bears at its edges, when seated against the bottom, against the opposed faces of the base 12 and lateral guide 13, and its faces engage the opposed faces of the front and back walls. As I have said, the front wall is relatively short; that is, it spans only a small portion of the distance which exists between the bottom 9 and the mouth 8, and thus the major portion of said front is open so that the bottom end of said spud may be tipped therethrough in the manner illustrated in dotted outline in Fig. 4 when the spud has been arranged so that its pointed end 6b projects further from the mouth than it did when the end 6a is in abutment with the bottom thereof. The spud may then be tipped as shown in dotted outline and be retracted.

Figure 1:
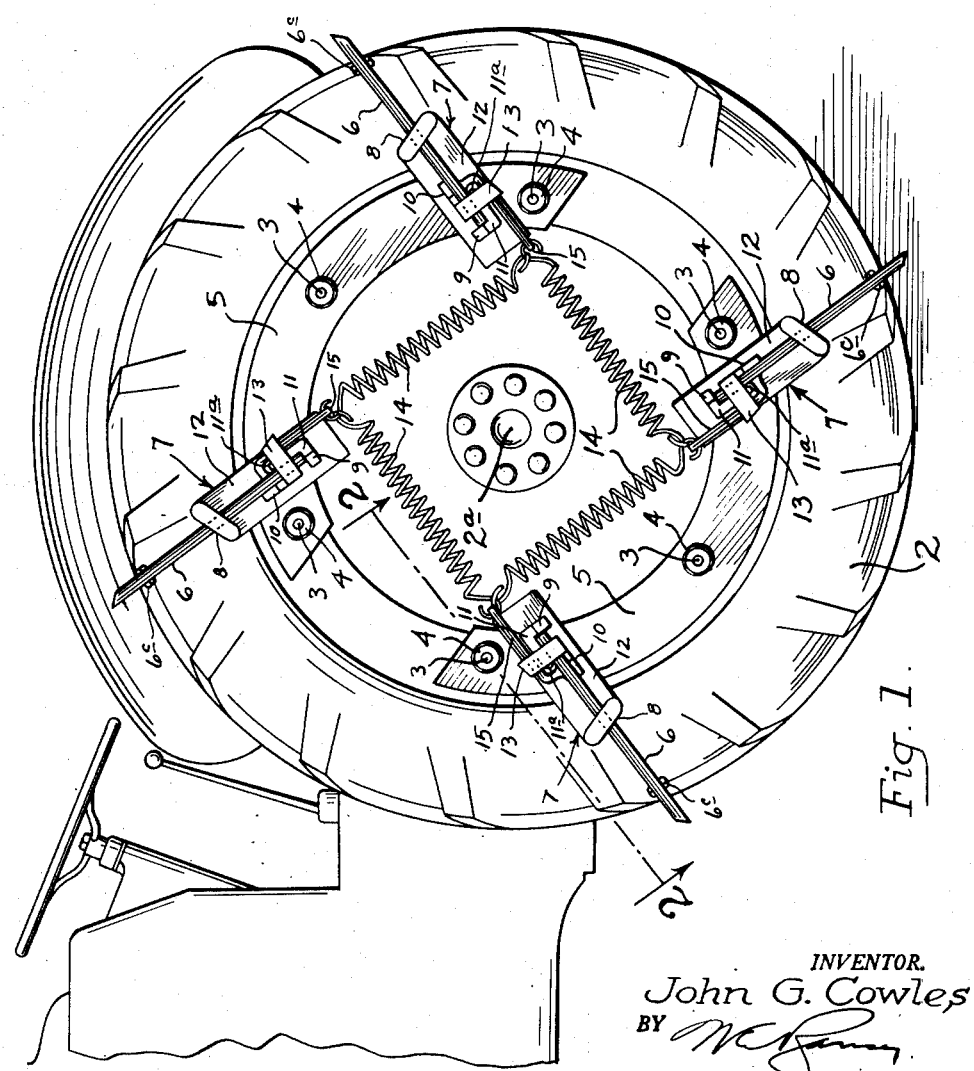
Fig. 1 is a side elevation of a driving wheel of a tractor with antiskid devices shown fixed up to the outer face thereof in extended or projecting position.

For this purpose, I provide a number of springs 14. If four spuds are provided, these springs may be joined by their ends to each other in a hollow square, as is shown in Figs. 1 and 3. One of said springs pulls more or less longitudinally upon a spud, while an adjacent spring pulls substantially normal to the first mentioned spring. Each spring is joined to an offset arm 15, which projects laterally from one face of a spud. Each offset arm projects beyond the end 6a of a retractable spud, and it is to said arm, on each spud, that the springs are attached, respectively.

When the spuds are retracted, as is shown in Fig. 3, two springs join together and tend to hold said spud in retracted position. One tends to pull it inwardly until through bolt 6c bears on the mouth of socket 7 and another spring tends to tip it laterally so that it is bound by frictional engagement with the mouth 8 of its socket and the marginal edge 11a of the front wall thereof as well as by contact of the bolt 6c with said mouth. Said springs are tension springs, and thus when a retractable spud is to be extended to the position in which said spuds are shown in Fig. 1, said springs are elongated, and when the end 6a of a spud passes over the marginal edge 11a of the front wall, it is pulled into abutment with the bottom 9 by reason of the joint action of the two springs which affect its equilibrium. Said springs tend to hold the retractable spud against inadvertent lateral or longitudinal movement. The spuds will thus tend to remain extended with their pointed edge 6b lying beyond the peripheral outline of the wheel until and unless they are manually tipped and retracted as is indicated in Fig. 4.

I have said that the sockets are preferably of skeletal outline. This is not essential, but it is desirable because it prevents mud, or dirt, or other foreign material from lodging within said sockets to prevent the free movement of the retractable spud therein. Because of said skeletal outline, said mud or other foreign matter tends to be shaken free by the rotation of the wheel and thus leave substantially unaffected the relationship of the spuds with their sockets, respectively.

As is shown in Figs. 1 and 3, said spuds do not extend radially with respect to the wheels upon which they are mounted, but extend in planes offset from the axle 2a of said wheel. Said arrangement tends to cause the pointed ends 6b of each of the spuds to enter the ground more or less point first when the wheels rotate counter-clockwise as viewed in said Figs. 1 and 3, which is the direction they would rotate when said tractor is being driven forwardly. Said spuds, being flat, also provide a paddle-like arrangement to provide a broader grip upon the earth, which is important, particularly if the ground which the tractor traverses is soft and wet, and it is in conditions such as these that the anti-skid feature of my invention has its greatest utility.

If it is desired to retract said spuds, this may be done merely by forcing them outwardly, tipping them laterally, and permitting the springs to retract them, as said springs will do due to their tension, when said spuds are arranged in the position indicated in dotted outline in Fig. 4. They cannot so retract said spuds when they are seated in the socket provided for them, because the end 6a bears against the bottom 9 and they are prevented from tipping by the engagement of one of their faces with the opposed face of the short front wall 11. If the entire antiskid device is to be removed from the wheel, this may easily be done by backing off the nuts 4 from the spuds 3, removing the frame members 5, and thus detaching the entire device.

I claim:

1. The combination with a driving wheel of a vehicle, of traction means, comprising a frame secured to one face of said wheel, said frame carrying a plurality of sockets spaced radially about said wheel, a retractable elongated spud slidably arranged in each of said sockets and being longitudinally retractable therein, said spuds being individually and selectively positionable in their sockets either to lie with their pointed outer ends extending beyond the peripheral outline of said wheel or retracted by lateral tipping within said sockets with said points lying within said sockets with said points lying within said peripheral outline each spud extending more or less radial to the driving wheel and in extended position bearing endwise in its socket, the socket being apertured to accommodate said tipping retraction, and a series of retracting springs joining said spuds together and positioned and arranged to aid in retracting them to the last mentioned position, said springs each being joined by their ends to adjacent springs arranged normal thereto.

2. The combination with a driving wheel of a vehicle, of traction means, comprising a frame secured to one face of said wheel, said frame carrying a plurality of sockets spaced radially about said wheel, and a retractable elongated spud slidably arranged in each of said sockets and being longitudinally retractable therein, said spuds being individually and selectively positionable in their sockets either to lie with their pointed outer ends extended beyond the peripheral outline of said wheel or retracted by lateral tipping within said sockets with said points lying within said peripheral outline each spud extending more or less radial to the driving wheel, each of said sockets comprising a skeletal mouth, bottom, back wall and a short front wall thus leaving the major portion of said front open to accommodate said lateral tipping upon retraction.

3. The combination with a driving wheel of a vehicle, of traction means, comprising a frame secured to one face of said wheel, said frame carrying a plurality of sockets spaced radially about said wheel, a retractable elongated spud slidably arranged in each of said sockets and being longitudinally retractable therein, said spuds being individually and selectively positionable in their sockets either to lie with their pointed outer ends extended beyond the peripheral outline of said wheel or retracted by lateral tipping within said sockets with said points lying within said peripheral outline each spud extending more or less radial to the driving wheel, each of said sockets comprising a skeletal mouth, bottom, back wall and a short front wall thus leaving the major portion of said front open to accommodate said lateral tipping upon retraction, each spud in extended position projecting longitudinally from the mouth of said socket and with its inner end seated upon the bottom of said socket, each spud being retractable into its socket by shifting it through said mouth and spacing it from said bottom, tipping its inner end laterally through the open front and retracting it through the mouth of said socket.

4. The combination with a driving wheel of a vehicle, of traction means comprising a frame secured to one face of said wheel, said frame carrying a plurality of sockets spaced radially about said wheel, a retractable elongated spud slidably arranged in each of said sockets and being longitudinally retractable therein, said spuds being individually and selectively positionable in their sockets either to lie with their pointed outer ends extended beyond the peripheral outline of said wheel or retracted by lateral tipping within said sockets with said points lying within said peripheral outline each spud extending more or less radial to the driving wheel, a retracting spring joining said spud and positioned and arranged to aid in retracting it to the last mentioned position, each of said sockets comprising a skeletal mouth, bottom, back wall and a short front wall thus leaving the major portion of said front open to accommodate said lateral tipping upon retraction, each spud in extended position projecting longitudinally from the mouth of said socket and with its inner end seated upon the bottom of said socket, said spud being retractable into its socket by shifting it through said mouth and spacing it from said bottom, tipping its inner end laterally through the open front and retracting it through the mouth of said socket.

5. An antiskid device for the driving wheel of a vehicle, comprising a socket proportioned and arranged for securing to the side face of said wheel, said socket comprising a mouth, bottom, back wall and a short front wall thus leaving the major portion of said front open, an elongated pointed spud slidably mounted between said back wall and said front wall and within said socket with its pointed end extending through said mouth, and a resilient retracting means positioned and arranged to retract said pointed end through said mouth, said spud in extended position bearing in said socket, and being retractable by first shifting it outwardly through said mouth and by then tipping it laterally over said short front wall and through said open front.

6. An antiskid device for the driving wheel of a vehicle, comprising a socket proportioned and arranged for securing to the side face of said wheel, said socket comprising a mouth, bottom, back wall and a short front wall thus leaving the major portion of said front open, an elongated pointed spud slidably mounted between said back wall and said front wall and within said socket with its pointed end extending through said mouth, a resilient retracting means positioned and arranged to retract said pointed end through said mouth, said spud in extended position bearing in said socket, and being retractable by first shifting it outwardly through said mouth and tipping it laterally through said open front, and means limiting the degree to which said spud may be retracted.

7. An antiskid device for the driving wheel of a vehicle, comprising a socket proportioned and arranged for securing to the side face of said wheel, said socket comprising a mouth, bottom, back wall and a short front wall thus leaving the major portion of said front open, an elongated pointed spud slidably mounted between said back wall and said front wall and within said socket with its pointed end extending through said mouth, a spring positioned and arranged to retract said pointed end through said mouth, said spud in extended position bearing in said socket, and being retractable by first shifting it outwardly through said mouth and by then tipping it laterally over said short front wall and through said open front, a member carried by each spud and projecting therefrom limiting the degree to which said spud may be retracted.

8. An antiskid device for the driving wheel of a vehicle, comprising a socket proportioned and arranged for securing to the side face of said wheel, said socket comprising a mouth, bottom, back wall and a short front wall thus leaving the major portion of said front open, an elongated pointed spud slidably mounted between said back wall and said front wall and within said socket with its pointed end extending through said mouth, a resilient retracting means positioned and arranged to retract said pointed end through said mouth, said spud in extended position bearing on the bottom of said socket, and being retractable by first shifting it outwardly through said mouth and by then tipping it laterally over said short front wall and through said open front, said spud having an offset arm fixed thereto, extending through said open front and serving as a securing means for the resilient retracting means.

9. An antiskid device for the driving wheel of a vehicle, comprising a socket proportioned and arranged for securing to the side face of said wheel, said socket comprising a mouth, bottom, back wall and a short front wall thus leaving the major portion of said front open, an elongated pointed spud slidably mounted between said back wall and said front wall and within said socket with its pointed end extending through said mouth, a resilient retracting means positioned and arranged to retract said pointed end through said mouth, said spud in extended position bearing in said socket, and being retractable by first shifting it outwardly through said mouth and by then tipping it laterally over said short front wall and through said open front, said spud having an offset arm fixed thereto, extending through said open front and serving as a securing means for the resilient retracting means, and a pair of spaced guides extending laterally beyond the open face to engage said spud when retracted to inhibit lateral movement of said spud when it is retracted through said open front.

JOHN G. COWLES.

REFERENCES CITED

The following references are of record in the file of this patent:

UNITED STATES PATENTS

| Number | Name | Date |
| --- | --- | --- |
| 1,229,210 | Bartholomew | June 12, 1917 |
| 1,968,471 | Veith et al. | July 31, 1934 |
| 2,178,105 | Maxwell | Oct. 31, 1939 |
| 2,200,791 | Frisbie | May 14, 1940 |